Aug. 1, 1950    R. G. MILLER    2,517,012
FLUID-TIGHT CLOSURE
Filed Dec. 18, 1947
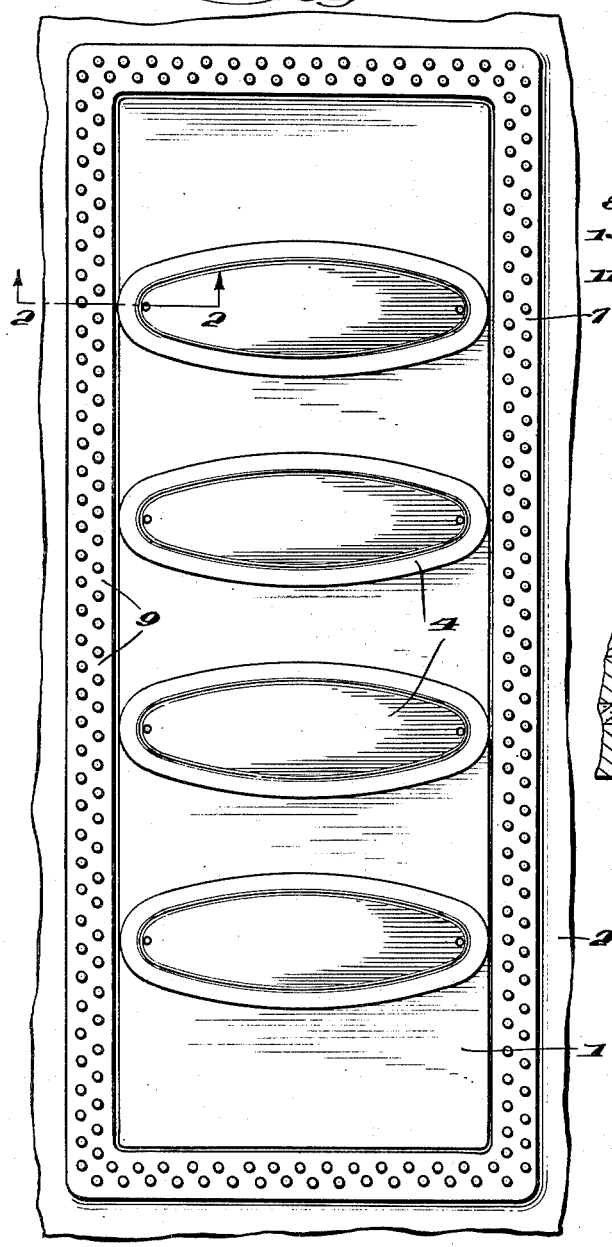
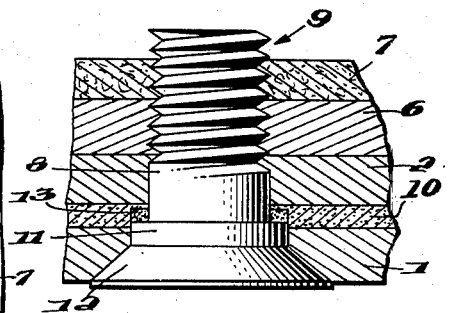
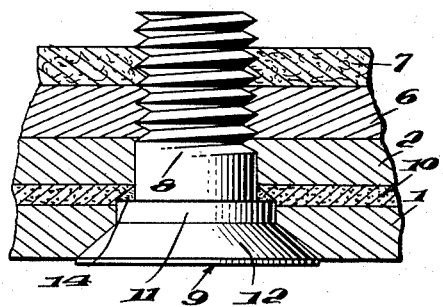
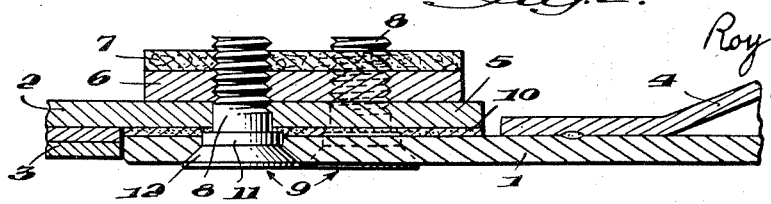
Inventor
Roy G. Miller
by Pierce, Scheffler & Parker
his Attorneys Patented Aug. 1, 1950

2,517,012

UNITED STATES PATENT OFFICE 2,517,012

FLUID-TIGHT CLOSURE

Roy G. Miller, Bayside, N. Y.

Application December 18, 1947, Serial No. 792,378

4 Claims. (Cl. 220—46)

The present invention relates to a fluid-tight closure.

My invention is concerned with closures of the type commonly used for the access openings in the underside of the wing fuel tanks of aircraft, which closures typically comprise a door member secured to the frame surrounding the opening by means of a large number of screws. Considerable difficulty has been encountered with leakage through the screw openings and there is therefore a need for a leakproof closure adapted not only for use in new construction but also for substitution for existing closures without material change in the existing door frame or other parts of the aircraft.

Accordingly, it is an object of this invention to provide a leak-proof closure for the access openings of the wing fuel tanks of aircraft, and the invention is concerned in particular with the provision of means for positive prevention of leakage through the screw holes and around the screws. Other objects include provision of a liquid-tight closure:

(a) Adapted for use on aircraft already in service without structural change in other parts of the aircraft, (b) Adapted for ease of maintenance and satisfactory service life, (c) Which incorporates a permanent seal between the door and the door frame, (d) Which maintains the strength of a wing at or above its original design strength, (e) Which is resistant to aromatic fuels, (f) Which does not require use of a sealing compound which would hinder removal of the door, (g) Adapted to be readily removed and repeatedly re-used, and (h) Adapted for use in the field without need of skilled mechanics.

It will be obvious that the sealing means of the invention is not limited to fuel tank openings or to aircraft applications but may be employed in a variety of situations wherein it is desired to have a fluid-tight closure and to prevent leakage of liquid through and around the screws which pass through a gasket or gasket material.

The invention is illustrated by the drawings in which:

Fig. 1 is a topside or inside plan view of an access door mounted on the under side of a wing fuel tank, Fig. 2 is a section taken on the line 2—2 of Fig. 1, Fig. 3 is a similar section of a modified form of the invention, and Fig. 4 is a similar section of another modification.

With reference to the drawing, a fuel tank access door 1 is shown (Fig. 1) positioned to close the opening in a fuel tank 2 mounted in a wing 3 of an aircraft. Stiffeners 4 spot-welded to the door enhance its strength.

A door frame 5 is formed by the edges of the tank 2 which surround the opening. A tapping strip 6 and a fiber locking strip 7 respectively overlie the door frame. These serve as reinforcement for the door frame and as additional anchoring and retaining means for shanks 8 of screws 9 which secure the door in place over the opening. An impervious gasket 10 is positioned between the adjacent surfaces of the door frame and the door.

As will be observed from the drawings, the openings for the screws are sufficiently small through the gasket and frame to provide a snug fit for the shanks of the screws, while the concentrically disposed openings in the door are larger to accommodate shoulders 11 of the screws when heads 12 of the screws are seated against the door. Thus, the portion (normally annular) of the gasket which surrounds the shank of a screw is compressed between the transverse face of the shoulder 11 of the screw and the door frame, producing a liquid-tight seal around each screw.

While the leak-proof closure of the invention is not limited to any particular method of fabrication, when a liquid-tight door is to be supplied for installation on a tank already in use it is preferred that the door—of appropriate size and shape—first be produced and drilled to form the screw holes corresponding to those existing in the door frame of the opening to which the door is to be applied. Obviously, the screws to be employed in making the closure are selected with a shank size in accordance with the holes existing in the door frame, and the holes in the door will be made of larger size to accommodate the shoulders of the screws. It is desirable that the hole sizes be such as to provide a snug fit with the screws.

It is preferable that the gasket be permanently cemented to the door whereby only one faying surface of the gasket need be sealed by the pressure of the screws. In addition, a cemented gasket is much less vulnerable to damage while the door is detached than would be a loose gasket, and further, it is impossible for a cemented gasket to shift out of alignment when the door is detached.

Therefore, the gasket is next cemented to the door and the screw holes are punched in the gasket. Cementing of the gasket prior to forming the screw holes in it insures proper location and concentricity of the holes, and the assembly is then ready for mounting over the opening. The door is positioned on the door frame with the holes all properly aligned, and the liquid-tight closure is effected merely by use of a screw driver or wrench to screw in all of the screws.

It is obvious that the screws should conform to the specifications necessary to insure that when they are tightened the heads will come into position bearing snugly against the door surface at about the same time that the transverse surfaces of the shoulders 11 clamp firmly against the gasket. With screws of proper dimensions, it is to be noted that the door installation is an exceedingly simple operation. The shoulder screws seal against the face of the gasket by clamping action and do not depend on the extrusion of the gasket into contact with the shank of the screw. Thus, while reasonable care should be exercised to avoid damage to the surface of the gasket or enlargement of the holes, the sealing contact of the screws is against a gasket surface that is not exposed to abrasion by the screw threads, and installation of the door may be accomplished without special tools or skill. Tests have shown that a considerable amount of deliberate mutilation of the margins of the gasket screw holes is necessary before leakage will result, indicating that it is not necessary to achieve highly accurate hole size or concentricity, but accuracy will insure an additional safety factor.

Since there are no devious leakage paths, nothing need be done to seal the threaded ends of the screws. In practice, it is desirable that the sealing take place near the screw heads. If a leak should develop because of loosening of a screw or a defect in the gasket material surrounding a screw, its appearance on the outside of the door would indicate the precise spot where corrective measures should be applied. Such a leak can be stopped by replacement of a single screw, whereas it would otherwise be necessary to remove a large number of screws or the entire door before the trouble spot could be located.

When it is necessary to make compensation for damage or wear of the gasket in the vicinity of a screw, a preferred procedure comprises removal merely of the one offending screw and reinsertion after the screw has been provided with an impervious washer or annular ring seal 13 (Fig. 3) which fits around the shank and against the transverse surface of the shoulder of the screw and may be of the same material as the gasket 10. A supply of these seals may be maintained on hand where needed and their installation may be accomplished without the necessity for emptying the tank. If an annular ring is not available, a suitable liquid-tight seal may be made by applying a sealant 14 (Fig. 4) in the form of a plastic and allowing it to cure, if necessary, and reinserting the screw.

The door is designed to allow for complete interchangeability with standard doors provided on equipment already in use, and may be installed on standard door frames in the field without difficulty by an unskilled worker, provided the door is made to proper specifications. It is further constructed to provide, in combination with a gasket and door frame, an all around liquid-tight closure in which there is positive elimination of leakage around the screws—the most prevalent type of leakage in closures of this type. The closure requires no change to existing door frames or to wing structure when used on aircraft wing tanks, and does not require any sealing compound which would hinder ready removal of the door from the frame. The door may be re-used repeatedly if reasonable care is exercised to avoid damage to the gasket, and no part of the closure is subject to detriment from aromatic fuels. A damaged or worn out gasket may of course be repaired or replaced.

While designed primarily for utilization as closures for access openings in the underside of the wing fuel tanks of aircraft, the liquid-tight closure disclosed herein is obviously capable of wide applicability, and tests conducted under extreme conditions both of elastic and permanent distortion have shown the improved sealing function of the means disclosed herein.

I claim:

1. A fluid-tight closure comprising a door frame surrounding an opening, a door overlying said frame and opening, a layer of gasket material disposed between the overlying surfaces of said door and frame, a plurality of larger cylindrical openings in said door, concentric smaller openings in said frame and gasket material and shoulder screws secured in said openings, said screws having shank portions fitting said smaller openings, shoulder portions fitting said larger openings and transverse shoulder surfaces bearing against annular portions of the gasket material surrounding said smaller openings.

2. A fluid-tight closure as defined in claim 1 in which the gasket material is compressed so that the shoulder portions of the screws extend a substantial distance into the space between the door and the frame occupied by the layer of gasket material.

3. A fluid-tight closure as defined in claim 1 in which a ring of gasket material surrounds the shank of a screw and is compressed between the transverse shoulder surface and the door frame.

4. A fluid-tight closure as defined in claim 1 in which the shoulder screws comprise a head portion having a transverse surface positioned to bear against a transverse surface of the door when the transverse shoulder surface is positioned a substantial distance within the space occupied by the layer of gasket material.

ROY G. MILLER.

REFERENCES CITED

The following references are of record in the file of this patent:

UNITED STATES PATENTS

| Number | Name | Date |
|---|---|---|
| 1,296,275 | Firth | Mar. 4, 1919 |
| 1,788,998 | Glass | Jan. 13, 1931 |
| 2,001,290 | Thomson | May 14, 1935 |